(12) United States Patent
Wan et al.

(10) Patent No.: US 10,429,567 B2
(45) Date of Patent: Oct. 1, 2019

(54) MULTI-VIEW PIXEL DIRECTIONAL BACKLIGHT MODULE AND NAKED-EYE 3D DISPLAY DEVICE

(71) Applicants: SUZHOU UNIVERSITY, Jiangsu (CN); SUZHOU SVG OPTRONICS TECHNOLOGY CO., LTD, Jiangsu (CN)

(72) Inventors: Wenqiang Wan, Jiangsu (CN); Linsen Chen, Jiangsu (CN); Yimin Lou, Jiangsu (CN); Donglin Pu, Jiangsu (CN); Ming Zhu, Jiangsu (CN); Pengfei Zhu, Jiangsu (CN); Su Shen, Jiangsu (CN); Yan Ye, Jiangsu (CN)

(73) Assignees: SUZHOU UNIVERSITY, Jiangsu (CN); SUZHOU SVG OPTRONICS TECHNOLOGY CO., LTD, Jiangsu (CN)

(*) Notice: Subject to any disclaimer, the term of this patent is extended or adjusted under 35 U.S.C. 154(b) by 83 days.

(21) Appl. No.: 15/540,223

(22) PCT Filed: Mar. 30, 2015

(86) PCT No.: PCT/CN2015/075376
§ 371 (c)(1),
(2) Date: Jun. 27, 2017

(87) PCT Pub. No.: WO2016/106987
PCT Pub. Date: Jul. 7, 2016

(65) Prior Publication Data
US 2017/0363794 A1 Dec. 21, 2017

(30) Foreign Application Priority Data
Dec. 31, 2014 (CN) .......................... 2014 1 0852242

(51) Int. Cl.
*G02B 27/22* (2018.01)
*H04N 13/32* (2018.01)
(Continued)

(52) U.S. Cl.
CPC .......... *G02B 6/0036* (2013.01); *G02B 6/003* (2013.01); *G02B 6/0025* (2013.01);
(Continued)

(58) Field of Classification Search
CPC .................................................. H04N 13/32
See application file for complete search history.

(56) References Cited

U.S. PATENT DOCUMENTS

| 8,982,323 B2 * | 3/2015 | Choi | G03F 7/70408 |
| | | | 355/46 |
| 2010/0220260 A1 * | 9/2010 | Sugita | G02B 6/003 |
| | | | 349/62 |

(Continued)

FOREIGN PATENT DOCUMENTS

| CN | 101930207 A | 12/2010 |
| CN | 102313203 A | 1/2012 |

(Continued)

OTHER PUBLICATIONS

Fattal et al, "A multi-directional backlight for a wide-angle, glasses-free three-dimensional display," Nature, vol. 495, pp. 348-351, Macmillan Publishers Limited, Mar. 21, 2013.

(Continued)

Primary Examiner — Jefferey F Harold
Assistant Examiner — Justin B Sanders
(74) Attorney, Agent, or Firm — Honigman LLP; Matthew H. Szalach; Jonathan P. O'Brien (57) ABSTRACT

A multi-view pixel directional backlight module and a naked-eye 3D display device are provided. The multi-view pixel directional backlight module includes at least two (Continued)

rectangular light guide plates closely stacked together. A light-emerging surface of the rectangular light guide plate is provided with multiple pixel arrays. Light emitted by pixels in a same pixel array is pointed to a same viewing angle, and different pixel arrays have different viewing angles. At least one side of each rectangular light guide plate is provided with a light source group. Light emitted by the light source group enters the corresponding light guide plate, then emerges from pixels of respective pixel arrays on the light-emerging surface of the light guide plate, and is totally reflected at positions other than positions of the pixels within the light guide plate. Each of the pixels is a nano-diffraction grating.

20 Claims, 5 Drawing Sheets

(51) Int. Cl.
| | | |
|---|---|---|
| *F21V 8/00* | (2006.01) | |
| *H04N 13/324* | (2018.01) | |
| *H04N 13/349* | (2018.01) | |
| *G02B 5/18* | (2006.01) | |

(52) U.S. Cl.
CPC ......... *G02B 6/0035* (2013.01); *G02B 6/0068* (2013.01); *G02B 6/0076* (2013.01); *G02B 27/22* (2013.01); *H04N 13/32* (2018.05); *H04N 13/324* (2018.05); *H04N 13/349* (2018.05); *G02B 5/1809* (2013.01)

(56) References Cited

U.S. PATENT DOCUMENTS

| | | | |
|---|---|---|---|
| 2012/0002444 | A1 | 1/2012 | Kim et al. |
| 2012/0032997 | A1 | 2/2012 | Cha et al. |
| 2012/0127751 | A1 | 5/2012 | Kimmel |
| 2014/0043377 | A1* | 2/2014 | Tanaka ................. G02B 6/0053 345/690 |
| 2014/0300960 | A1 | 10/2014 | Santori et al. |
| 2014/0375707 | A1 | 12/2014 | Wu et al. |
| 2015/0316776 | A1 | 11/2015 | Gao et al. |

FOREIGN PATENT DOCUMENTS

| | | | | |
|---|---|---|---|---|
| CN | 102707368 | | 10/2012 | |
| CN | 103246195 | A | 8/2013 | |
| CN | 203286399 | U | 11/2013 | |
| CN | 203337990 | U | 12/2013 | |
| CN | 103780893 | A | 5/2014 | |
| CN | 103982818 | A | 8/2014 | |
| CN | 104238185 | A | 12/2014 | |
| CN | 104460115 | A | 3/2015 | |
| JP | H06138459 | A | 5/1994 | |
| JP | 2011075979 | A | 4/2011 | |
| JP | 201226199 | A | 11/2012 | |
| KR | 20130017886 | A | 2/2013 | |
| WO | WO-2013180725 | A1 * | 12/2013 | ........... G02B 6/0043 |
| WO | WO-2014051624 | A1 | 4/2014 | |
| WO | WO-2014/120160 | A1 | 8/2014 | |

OTHER PUBLICATIONS

Fattal et al, Supplementary Information for "A multi-directional backlight for a wide-angle, glasses-free three-dimensional display," Nature Online <http://www.nature.com/search?q=10.1038%2Fnature11972> vol. 495, pp. 1-10, Macmillan Publishers Limited, Mar. 21, 2013.

State Intellectual Property Office As the International Searching Authority, International Search Report for PCT Application No. PCT/CN2015/075376, dated Sep. 25, 2015.

Japan Patent Office, Notification of Reasons for Refusal for JP Application No. 2017-535696 dated Jul. 6, 2018.

Korean Intellectual Property Office, Notification of Reason for Refusal for KR Application No. 2018-025654287, dated Apr. 13, 2018.

* cited by examiner

MULTI-VIEW PIXEL DIRECTIONAL BACKLIGHT MODULE AND NAKED-EYE 3D DISPLAY DEVICE

This application is the national phase of International Patent Application No. PCT/CN2015/075376, titled "MULTI-VIEW PIXEL DIRECTIONAL BACKLIGHT MODULE AND NAKED-EYE 3D DISPLAY DEVICE", filed on Mar. 30, 2015, which claims the benefit of priority to Chinese Patent Application No. 201410852242.3 titled "MULTI-VIEW PIXEL DIRECTIONAL BACKLIGHT MODULE AND NAKED-EYE 3D DISPLAY DEVICE", filed with the Chinese State Intellectual Property Office on Dec. 31, 2014, both of which are incorporated herein by reference in their entireties.

FIELD

The disclosure relates to the technical field of flat panel naked-eye 3D display, and particularly to a multi-view pixel directional backlight module and a naked-eye 3D display device fabricated based on the backlight module.

BACKGROUND

With a rise in the standard of living, flat 2D display has hardly satisfied people's increasing need. People start to pursue 3D display with depth perception, which provides a realistic presentation of an object. Since 3D display implemented using a stereoscope was first proposed by Wheatstone in 1838, 3D display has been the subject of vigorous, ongoing research for more than one century and various manners for implementing 3D display have been continually proposed.

Because the two eyes of a person are spaced apart by a certain distance, for a same object, the two eyes respectively view two images slightly different from each other. The two images are fused in the brain, thereby generating depth perception. The principle of 3D display is based on binocular parallax, where parallax images are respectively projected to the right eye and the left eye, ensuring that the left parallax image can be viewed by only the left eye, and the right parallax image can be viewed by only the right eye, such that the viewer can see a stereoscopic image.

The naked-eye 3D display technology has gained increasing attention from researchers, since no visual aid (for example, glasses, a head-mount display, or the like) is necessary for viewing a naked-eye 3D image. Currently, mature naked-eye 3D display technologies include the parallax barrier technology, the lenticular array technology, and the like. However, there are some deficiencies that these technologies cannot overcome, such as low resolution and eyestrain due to a long time of viewing parallax images. With directional backlight technology, in which images are alternatively displayed to the left eye and the right eye, 3D image display with a high resolution can be implemented. The following are examples. As proposed by Yu-Mioun Chu from Taiwan in 2005, 3D display is implemented by directional backlight formed using two wedge-structured lightguide plate, two sets of light sources and one absorption layer, in combination with a fast-switching LCD plate. As proposed by John c. Schultz et al. from Japan in 2009, full-resolution 3D display is implemented using one light guide plate, two LED light sources and a 3D film in combination with a 120 Hz LCD plate. In Chinese patent CN201320143064.8, a directional backlight 3D imaging system is proposed, which uses two projection lenses in combination with a direction 3D optical structure for implementing naked-eye 3D display. The above directional backlight technologies are restricted to a single viewing angle, although high image resolution can be obtained. In view of this, Chin-Hung Ting et al. from Taiwan proposed in 2001 a multi-user 3D film structure applied in a directional backlight system having a single pair of viewing angles, which can implement multi-viewing angle 3D display. Such 3D film has an inverted trapezoidal structure, and is capable of projecting emergent light in three (or more) directions for being viewed by three (or multiple) users simultaneously. In addition, a naked-eye 3D backlight module is proposed in Chinese patent CN201410187534.X, which implements 3D display using one or more sets of LED sequential light sources in combination with convex lenses, polygonal prisms and a parallax barrier. However, the design and high precision machining of the backlight source is difficult technically, and crosstalk of light rays may occurs often.

In international patent of WO2014051624 A1, HEWLETT proposed multi-viewing angle display implemented using waveguide array directional backlight integrated with hybrid lasers, where waveguide arrays are used for guiding red, green and blue light, and directional guiding of light beams are implemented using pixel gratings. With this method, colored multi-view 3D display can be implemented. However, the colored multi-view 3D display is implemented by integrating hybrid lasers into a waveguide array base, which has a high requirement on the fabrication process and has a high cost, and therefore is not conducive to industrial mass production.

In 2013, a multi-view pixel grating directional backlight source is proposed by HEWLETT in a paper in the journal Nature, which can implement, in combination with LCD technology, multi-view naked-eye 3D display. The directional backlight source mainly includes a light guide plate, a collimated light source, and a nano-diffraction grating. Collimated polarized light is transmitted within the light guide plate by means of total reflection, and is incident on a surface of the pixel nano-diffraction grating. Diffraction of light in different viewing angles can be achieved by designing nano-diffraction grating pixels with different periods and different orientation angles. For obtaining true color display, hexagonal light guide plates are adopted in this paper for directional guide of red light, green light and blue light. However, this hexagonal light guide plate does not match with existing flat panel display in displaying manners, and is particularly difficult to be applied to rectangular displays of, for example, smart phones. Moreover, the nano-diffraction grating is fabricated using electron beam exposure, which is inefficient and costly, and is not suitable for preparing a large-sized device.

Therefore, a revolutionary progress can be brought to the naked-eye 3D technology by modifying the above hexagonal light guide plate to a rectangular light guide plate.

SUMMARY

In view of this, it is an object of the present disclosure to provide a pixel directional backlight module using a rectangular light guide plate, which is more applicable and has high industrial applicibility.

Based on the object of the present disclosure, it is provided a multi-view pixel directional backlight module, which includes at least two rectangular light guide plates closely stacked together, where a light-emerging surface of the rectangular light guide plate is provided with multiple pixel arrays, pixels of respective pixel arrays is interleaved with each other in an ordered or unordered manner and is uniformly distributed on the light-emerging surface of the light guide plate, light emitted by pixels in a same pixel array is pointed to a same viewing angle, and different pixel arrays have different viewing angles; and at least one side of each rectangular light guide plate is provided with a light source group, light emitted by the light source group enters the corresponding light guide plate, then emerges from pixels of respective pixel arrays on the light-emerging surface of the light guide plate, and is totally reflected at positions other than positions of the pixels within the light guide plate, each of the pixels is a nano-diffraction grating.

Preferably, the number of the rectangular light guide plates may be two, where a first rectangular light guide plate is provided with a first light source group and a second light source group respectively on one or both sides of two pairs of parallel opposite sides, and a second rectangular light guide plate is provided with a third light source group on one or both of one pair of parallel opposite sides, and each of the first light source group, the second light source group and the third light source group emits monochromatic light of a different color.

Preferably, the first rectangular light guide plate and the second rectangular light guide plate may be stacked with the light-emerging surface of the second rectangular light guide plate facing a non-light-emerging surface of the first rectangular light guide plate, or the light-emerging surface of the first rectangular light guide plate facing a non-light-emerging surface of the second rectangular light guide plate.

Preferably, projections of the pixels in the second rectangular light guide plate on the first rectangular light guide plate may be not overlapped with the pixels in the first rectangular light guide plate.

Preferably, each of the pixels in the first rectangular light guide plate may include two sub-pixels of different colors, light from the first light source group emerges from a first sub-pixel, and light from the second light source group emerges from a second sub-pixel, the light emerging from the first sub-pixel is in a same direction as the light emerging from the second sub-pixel of a same pixel as the first sub-pixel.

Preferably, light emitted by each of the pixels in the second rectangular light guide plate may emerge after passing through the first rectangular light guide plate, an emerging direction of the light is the same as that of light emerging from the pixel in the first rectangular light guide plate adjacent to the projection of the pixel in the second rectangular light guide plate on the first rectangular light guide plate; or light emitted by each of the pixels in the first rectangular light guide plate may emerge after passing through the second rectangular light guide plate, an emerging direction of the light is the same as that of light emerging from the pixel in the second rectangular light guide plate adjacent to the projection of the pixel in the first rectangular light guide plate on the second rectangular light guide plate.

Preferably, the number of the rectangular light guide plates may three, where a first rectangular light guide plate is provided with a first light source group on one or both sides of one pair of parallel opposite sides, a second rectangular light guide plate is provided with a second light source group disposed on one or both sides of one pair of parallel opposite sides, and a third rectangular light guide plate is provided with a third light source group disposed on one or both sides of one pair of parallel opposite sides, and each of the first light source group, the second light source group and the third light source group emits monochromatic light of a different color.

Preferably, the first rectangular light guide plate, the second rectangular light guide plate and the third rectangular light guide plate may be stacked with the light-emerging surface of the third rectangular light guide plate facing a non-light-emerging surface of the second rectangular light guide plate, and the light-emerging surface of the second rectangular light guide plate facing a non-light-emerging surface of the first rectangular light guide plate.

Preferably, projections of the pixels in the third rectangular light guide plate on the first rectangular light guide plate, projections of the pixels in the second rectangular light guide plate on the first rectangular light guide plate and the pixels in the first rectangular light guide plate may be not overlapped with each other.

Preferably, light emitted by each of the pixels in the third rectangular light guide plate may emerge after passing through the second rectangular light guide plate and the first rectangular light guide plate, light emitted by each of the pixels in the second rectangular light guide plate may emerge after passing through the first rectangular light guide plate, light emitted by a pixel in the first rectangular light guide plate, light emitted by the pixel in the third rectangular light guide plate of which the projection on the first rectangular light guide plate is adjacent to the pixel in the first rectangular light guide plate, and light emitted the pixel in the second rectangular light guide plate of which the projection on the first rectangular light guide plate is adjacent to the pixel in the first rectangular light guide plate and is adjacent to the projection of the pixel in the third rectangular light guide plate on the first rectangular light guide plate are in a same direction.

Preferably, the light source group may include a monochromatic light source, a light source collimation system and a prism, light emitted by the monochromatic light source is collimated by the light source collimation system, then enters the rectangular light guide plate via the prism, and is totally reflected.

Preferably, the light source collimation system may be a planar Fresnel lens array.

Preferably, the light source group may include a first light source group, a second light source group and a third light source group respectively emitting red light, green light and blue light.

Preferably, viewing angles of the multiple pixel arrays may have a continuous distribution.

Preferably, viewing angles of the multiple pixel arrays are range from 0 degree to 50 degrees.

In addition, a naked-eye 3D display device is provided according to the present disclosure, which includes the above multi-view pixel directional backlight module, a liquid crystal panel located in front of the multi-view pixel directional backlight module, and a drive apparatus for driving the liquid crystal panel.

Preferably, the rectangular light guide plate may be provided with a light source on one side of a pair of parallel opposite sides, pixels on the liquid crystal panel is respectively aligned with pixels in the rectangular light guide plates, light guided by the rectangular light guide plates at a viewing angle matches with an image on the liquid crystal panel at the viewing angle, and the multiple rectangular light guide plates switch colors to match colors required by the liquid crystal for forming an image, to acquire naked-eye 3D display.

Preferably, the rectangular light guide plate may be provided with light sources on both sides of a pair of parallel opposite sides, pixels on the liquid crystal panel are not necessarily aligned with pixels in the rectangular light guide plates, the liquid crystal panel is configured to perform image control, and the light guide plate is configured to actively switch between two relative directions of light from light sources of a same color, to switch between images at different viewing angles, naked-eye 3D display is acquired by matching different light beams with an image on the liquid crystal panel at the viewing angle, and matching image refresh of the liquid crystal panel with switching between light sources at both sides. The present disclosure is advantageous as compared with the conventional technology in that, multiple layers of light guide plate are utilized, thereby overcoming the problem that multiple light sources cannot be integrated in one rectangular light guide plate, such that the rectangular light guide plate can be applied in the directional backlight module. In addition, the light source is collimated using the Fresnel lens array, which can be easily integrated, thereby providing a possibility for large-scale application of the naked-eye 3D technology.

BRIEF DESCRIPTION OF THE DRAWINGS

To illustrate technical solutions according to embodiments of the present disclosure or in the conventional technologies more clearly, drawings to be used in the descriptions of the embodiments or the conventional technologies are described briefly hereinafter. Apparently, the drawings described hereinafter are only for some embodiments of the present disclosure, and other drawings may be obtained by those skilled in the art based on those drawings without creative efforts.

DETAILED DESCRIPTION OF THE EMBODIMENTS

As described in the BACKGROUND, among various means for implementing naked-eye 3D display, the pixel directional backlight module has gained attention from researchers in the art and has become one of the technologies having the prospect of large-scale application in naked-eye 3D display because of the capability of obtaining a wide viewing angel.

Figure 1:
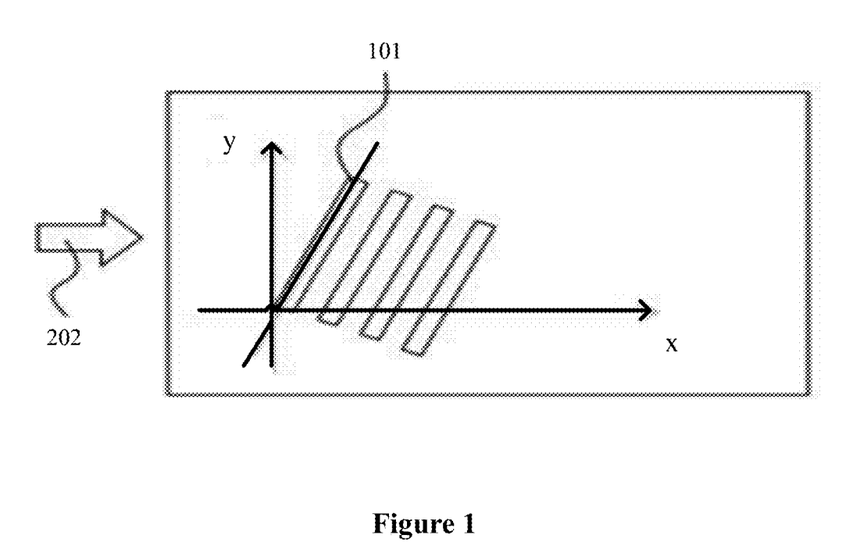
FIG. 1 is a schematic structural diagram of a nano-diffraction grating in an XY plane.
Figure 2:
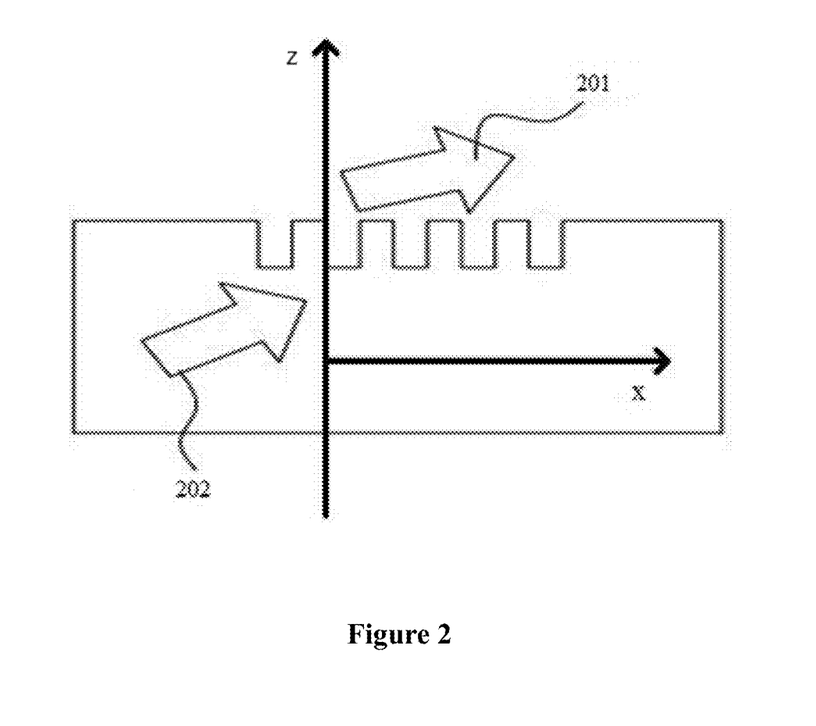
FIG. 2 is a schematic structural diagram of the nano-diffraction grating in FIG. 1 in an XZ plane.

Reference is made to FIG. 1 and FIG. 2, which are schematic structural diagrams of a diffraction grating in a nano-scale in an XY plane an XZ plane, respectively. According to a grating equation, a period and an orientation angle of a nano-diffraction grating pixel 101 satisfies the following relationships.

$$\tan \phi_1 = \sin \phi/(\cos \phi - n \sin \theta(\Lambda/\lambda)) \qquad (1)$$

$$\sin^2 (\theta_1) = (\lambda/\Lambda)^2 - 2n \sin \theta \cos \phi(\lambda/\Lambda) \qquad (2)$$

where a light beam transmits along the positive direction of the X-axis, $\theta_1$ and $\phi_1$ are respectively a diffraction angle (an angel between the diffraction light beam and the positive direction of the Z-axis) and an azimuth angle (an angel between the diffraction light beam and the positive direction of the X-axis) of a diffraction light beam 201, $\theta$ and $\lambda$ are respectively an incident angle (an angle between an incident light beam and the positive direction of the Z-axis) and a wavelength of the light source 202, and $\phi$ are respectively a period and an orientation angle (an angle between the groove orientation and the positive direction of the Y-axis) of the nano-diffraction grating 101, and n represents a refractive index of light waves in the light guide plate. In other words, in a case that the wavelength and the incident angle of the incident light beam, and the diffraction angle and the diffraction azimuth angle of the diffraction light beam are specified, the required period and the required orientation angle of the nano-diffraction grating can be calculated according to the above two equations. For example, in a case that red light having a wavelength of 650 nm is incident at an angle of 60° (with the refractive index being 1.5), the diffraction angle of the diffraction light is 10° and the diffraction azimuth angle of the fraction light is 45°, the corresponding period of the nano-diffraction grating is calculated to be 550 nm, and the corresponding orientation angle of the nano-diffraction grating is calculated to be −5.96°.

Based on the above principle, theoretically, sufficient light beams directed to different viewing angles can be acquired by fabricating multiple nano-diffraction gratings which have different orientation angles and different periods determined as required on a surface of a light guide plate. Taking each nano-diffraction grating as one pixel, and combining with color and grey scale control, naked eye 3D display having multiple viewing angles can be implemented.

However, the following problem arises if the above light guide plate provided with the nano-diffraction grating is applied to a backlight module. For a nano-diffraction grating, light incident from either the positive direction or the negative direction of the X-axis emerges after being diffracted. The case that such nano-diffraction grating serving as a pixel is applied on a rectangular light guide plate is discussed below. The rectangular light guide plate has only two pairs of nonparallel sides, but expression of colors depends on combinations of three colors of red, green and blue (or other three colors). It is indicated that, if light sources of three colors are used in one rectangular light guide plate, it is necessary to provide two light sources of different colors on a same pair of parallel opposite sides. In this case, light from the two light sources is incident to a same nano-diffraction grating from the positive direction and the negative direction, resulting in light of two colors simultaneously emerging from one pixel, thereby generating "mixed light" instead of monochromatic light. Therefore, in order to acquire monochromatic light at each pixel, in the conventional technology, a hexagonal light guide plate is designed to make light beams to be incident into the light guide plate from three different directions, thereby avoiding the "mixed light". However, such hexagonal light guide plate cannot match any existing display and thus has limited applicability, which limits the popularization of the multi-view directional backlight module.

The key for solving the above technical problem is how to avoid two beams of "different-colored light" in a same direction or in relative directions in the rectangular light guide plate.

In order to solve the above problem, a pioneering concept of multi-layer light guide plate is proposed, where light sources of at most two colors are provided on one rectangular light guide plate, thereby ensuring that light beams from the light sources of two colors are incident at different angles, and thus the problem of "mixed light" at a same pixel in the rectangular light guide plate can be solved. Combinations of three colors red, green and blue are implemented using different light guide plates.

In the following, the technical solution of the present disclosure is described in detail.

Figure 3:
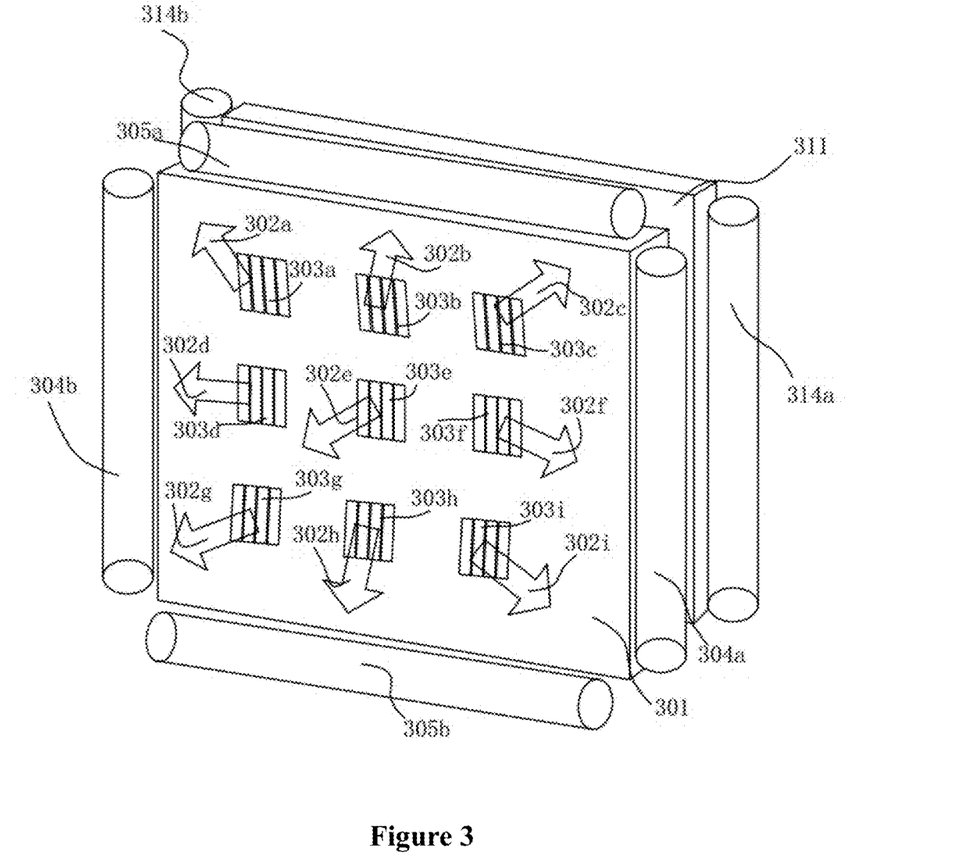
FIG. 3 is a schematic structural diagram of a multi-view pixel directional backlight module according to a first embodiment of the present disclosure.

Reference is made to FIG. 3, which is a schematic structural diagram of a multi-view pixel directional backlight module according to a first embodiment of the present disclosure. The multi-view pixel directional backlight module includes a first rectangular light guide plate 301 and a second rectangular light guide plate 311, which are closely stacked together in practices. A surface which emits light is defined as a light-emerging surface of the rectangular light guide plate. Pixels are distributed throughout the light-emerging surface of each rectangular light guide plate, each pixel representing one nano-diffraction grating. Taking the first rectangular light guide plate 301 as an example, multiple nano-diffraction gratings 303a to 303i having diffraction directions 302a to 302i are shown in FIG. 3 in a simplified manner. These nano-diffraction gratings are actually small points in the micro/nano-scale. The multiple pixels form multiple pixel arrays, where pixels in respective pixel arrays are interleaved with each other in an ordered or an unordered manner, and pixels in each pixel array are uniformly disturbed on the light-emerging surface of the rectangular light guide plate. Light emitted by pixels in a same pixel array is directed to a same viewing angle, and different pixel arrays have different viewing angles. For example, assuming there are a total of ten pixel arrays in the rectangular light guide plate, an image individually formed by each pixel array can be viewed from one of the ten viewing angles, and with any two successive viewing angles corresponding to two eyes of a person, a 3D image can be viewed. Pixels in each of the ten pixel arrays are uniformly distributed on the light-emerging surface. If the ten pixel arrays are numbered from 1 to 10, pixels in the ten pixel arrays may be arranged at an interval in an order from 1 to 10 or in an unordered manner as long as it is ensured that between any two adjacent pixels in the same pixel array, nine pixels respectively in the other nine pixel arrays are arranged. It is to be noted that, the fact that light emitted by pixels in the same pixel array being directed to a same viewing angle does not indicate that pixel gratings in the same pixel array have the same diffraction angel, but that light diffracted by these gratings are pointed to the same position, at which a human eye can view light beams emitted by all pixels in a same pixel array. The number of pixel arrays is limited by the size of the rectangular light guide plate and the size of a single pixel in the current process. By sacrificing the resolution to a certain degree, multiple pixel arrays can be fabricated on one rectangular light guide plate. The number of viewable angles increases with the number of pixel arrays. Ideally, in a case of a sufficient number of pixel arrays, viewing angles of these pixel arrays can have a continuous distribution, thereby achieving the effect that a 3D image can be observed at any viewing angle between, for example, 0-50 degrees.

Figure 4:
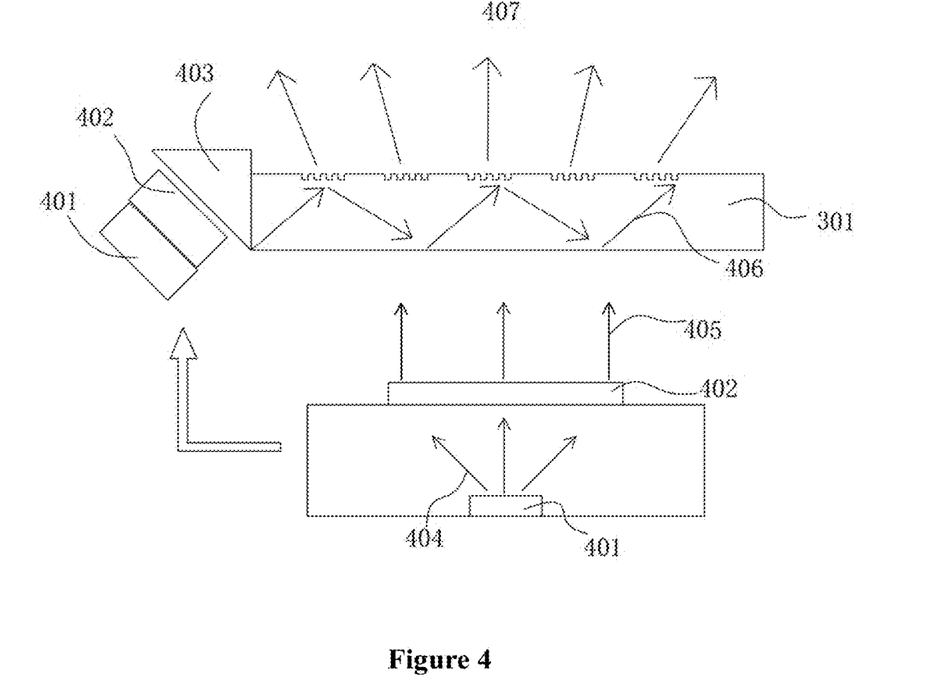
FIG. 4 is a schematic structural diagram of a single light source group.

Further, the first rectangular light guide plate 301 is provided with two light source groups, which are respectively arranged on two pair of parallel opposite sides 304a-304b and 305a-305b of the first rectangular light guide plate 301. The second rectangular light guide plate 311 is provided with one light source group. The light source group on the opposite sides 304a-304b is a first light source group, the light source group on the opposite sides 305a-305b is a second light source group, and the light source group on the opposite sides 314a-314b of the second rectangular light guide plate 311 is a third light source group. The three light source groups respectively emit red light, green light and blue light. Each light source group includes one or two light sources (the case of two light sources is shown in the figure). In a following, a case where the first light source group is a red light source group, the second light source group is a green light source group, and the third light source group is a blue light source group is described as an example. Apparently, colors of these light sources can be interchanged and are not limited to the above example. In some specific scenario, the above three colors may even be replaced by any other solid colors such as yellow, cyan, and magenta, as long as it is ensured that each light source group emits light of a different color. The first light source group includes a red light source, a first light source collimation system and a first prism (not shown in the figure). The second light source group includes a green light source, a second light source collimation system and a second prism (not shown in the figure). The third light source group includes a blue light source, a second light source collimation system and a third prism (not shown in the figure). In the following, the first light source group is described as an example. Referring to FIG. 4, the first light source group includes a red light source 401, a planar Fresnel lens array 402, and a prism 403. A light beam 404 emitted by the red light source 401 is collimated to a plane wave 405 after passing through the first light source collimation system 402, then is directed into the first rectangular light guide plate 301 via the prism 403, and forms total reflected light 406 in the first rectangular light guide plate 301. In a case that the total reflected light within the first rectangular light guide plate 301 meets the nano-diffraction gratings at locations of pixels, the total reflected light is diffracted by the nano-diffraction gratings and emerges, thereby forming emergent light 407 in different directions. Under regulation of these designed nano-diffraction gratings, the emergent light 407 is directionally guided, thereby providing light sources for forming multiple directional images.

In the manner shown in the figure, the second rectangular light guide plate 311 is stacked with the first rectangular light guide plate 301 with the light-emerging surface of the second rectangular light guide plate 311 facing a non-light-emerging surface of the first rectangular light guide plate 301. In another embodiment, the second rectangular light guide plate 311 may be stacked with the first rectangular light guide plate 301 with the light-emerging surface of the first rectangular light guide plate 301 facing a non-light-emerging surface of the second rectangular light guide plate 311. The two manners are interchangeable. The manner shown in the figure is described as an example. Since each rectangular light guide plate is actually a thin film having a certain degree of transparency, among the two stacked rectangular light guide plate are stacked together, light emitted by the second rectangular light guide plate 311 at a relatively lower position emerges after being transmitted through the first rectangular light guide plate 301. It is to be noted that, light beams within the light guide plate are generally transmitted in a total reflection manner, but after being diffracted by the nano-diffraction grating, the emerging angles relative to normal are in the range of 0 degree to +/−30 degrees. Therefore, when passing through the first rectangular light guide plate 103a covering the second rectangular light guide plate 103b, light beams emitted by the second rectangular light guide plate 103b are not totally reflected, but are mostly transmitted through the first rectangular light guide plate, with only small part of the light being reflected and absorbed. The total transmittance depends on a material of the light guide plate. In a case that the light guide plate is made of a material with a high transmittance, a transmittance for the light beams emitted by the second rectangular light guide plate 311 and transmitted through the first rectangular light plate 301 may be above 85%. In spite of this, considering the part of light beams which is reflected an absorbed, light sources on the front and the back light guide plates can be designed such that the intensity of the light source on the second rectangular light guide plate 311 is greater than the intensity of the light source on the first rectangular light guide plate 301 above the second rectangular light guide plate 311, thereby achieving an overall effect that the light beams emitted by the second rectangular light guide plate 311 and transmitted through the first rectangular light guide plate 301 can have almost the same intensity as the light beams emitted by the light source on the first rectangular light guide plate 301 and emerging from the first rectangular light guide plate 301. In this way, a problem that light beams emitted by some pixels are bright, while light beams emitted by some other pixels are relatively dim can be avoided in a display device fabricated with this module.

Figure 5:
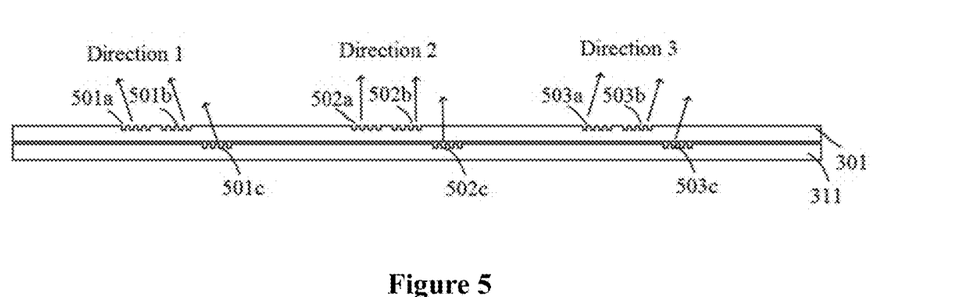
FIG. 5 is a schematic diagram illustrating a non-overlapped arrangement of pixels in light guide plates according to the first embodiment of the present disclosure.

Further, in the two stacked rectangular light guide plates, projections of pixels in the second rectangular light guide plate 311 on the first rectangular light guide plate 301 are not overlapped with the pixels in the first rectangular light guide plate. For example, as shown in FIG. 5, pixels 501c, 502c and 503c in the second rectangular light guide plate 311 are not overlapped with pixels 501a to 501b, 502a to 502b, and 503a to 503b in the first rectangular light guide plate 301. Therefore, the light beam emitted by each pixel in the second rectangular light guide plate 311 does not enter any of the pixels in the first rectangular light guide plate 103a, thereby avoiding interference among pixels.

Further, based on a similar principle of existing display devices, a pixel seen by human eyes are actually consists of red, green and blue three sub-pixels. In this embodiment, the red, green and blue three sub-pixels consists of two sub-pixels in the first rectangular light guide plate 301 and one sub-pixel in the second rectangular light guide plate 311. That is, in the first rectangular light guide plate 301, each pixel includes two sub-pixels of different colors, where light from the first light source group emerges from the first sub-pixel, and light from the second light source group emerges from the second sub-pixel, light emerging from two sub-pixels of a same pixel being in a same direction. Apparently, when considering in combination with the second rectangular light guide plate, one pixel should be understood as including three sub-pixels, and the three sub-pixels in a same pixel have a same emerging direction. That is, light emitted by a pixel in the second rectangular light guide plate 311 passes through the first rectangular light guide plate 301 and emerges in a same direction as light emitted by a pixel in the first rectangular light guide plate 301 adjacent to the projection of the pixel in the second rectangular light guide plate 311 on the first rectangular light guide plate 301. For example, as shown in FIG. 5, pixels 501a and 501b in the first rectangular light guide plate 301 respectively correspond to light emitted by the first light source and the second light source, and the pixel 501c in the second rectangular light guide plate 311 corresponds to light emitted by the third light source. Light emitted by the pixels 501a, 501b and 501c are in a same direction. The case is the same for pixels 502a to 502c, and pixels 503a to 503c.

Figure 6:
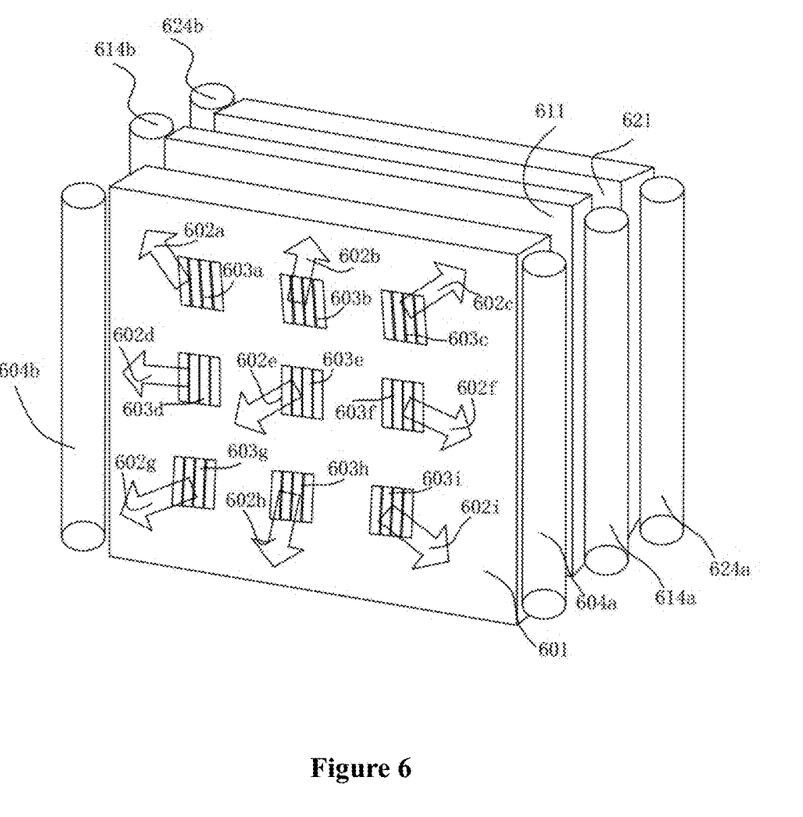
FIG. 6 is a schematic structural diagram of a multi-view pixel directional backlight module according to a second embodiment of the present disclosure.
Figure 7:
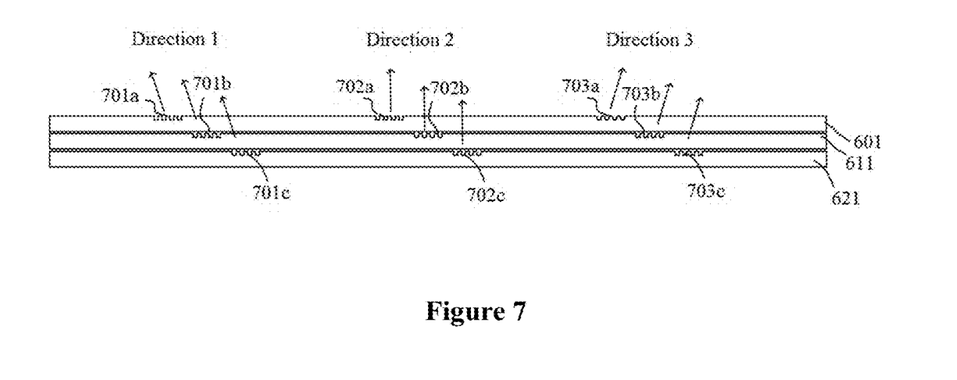
FIG. 7 is a schematic diagram illustrating a non-overlapped arrangement of pixels in light guide plates according to the second embodiment of the present disclosure.

Reference is made to FIG. 6, which is a schematic structural diagram of a multi-view pixel directional backlight module according to a second embodiment of the present disclosure. In this embodiment, there are a total of three rectangular light guide plate, where a light-emerging surface of each rectangular light guide plate is provided with multiple pixels having different orientations. Taking the first rectangular light guide plate 601 shown in the figure as an example, multiple nano-grating pixels 602a to 602i are arranged on the light-emerging surface of the first rectangular light guide plate 601, for directing light at viewing angles 603a-603i. The pixels are arranged in the same manner as the first embodiment, which is not repeated herein. Each rectangular light guide plate is provided with only one light source group. The first rectangular light guide plate 601 is provided with a first light source group on only one pair of parallel opposite sides 604a and 604b, the second rectangular light guide plate 611 is provided with a second light source group on only one pair of parallel opposite sides 614a and 614b, and the third rectangular light guide plate 621 is provided with a third light source group on only one pair of parallel opposite sides 624a and 624b. Each of the first light source group, the second light source group and the third light source group emits monochromatic light with a different color. Similar to the first embodiment, the three rectangular light guide plates are stacked together to form an integral backlight module. As schematically illustrated in the figure, the three rectangular light guide plates are stacked together with a light-emerging surface of the third rectangular light guide plate 621 facing a non-light-emerging surface of the second rectangular light guide plate 611, and the light-emerging surface of the second rectangular light guide plate 611 facing a non-light-emerging surface of the first rectangular light guide plate 601. Apparently, the three rectangular light guide plates may be stacked in other orders, which are not described herein. In the stacked three rectangular light guide plates, projections of the pixels in the third rectangular light guide plate 621 on the first rectangular light guide plate 601, projections of the pixels in the second rectangular light guide plate 611 on the first rectangular light guide plate 601, and the pixels in the first rectangular light guide plate 601 are not overlapped with each other. For example, as shown in FIG. 7, pixels 701a, 702a and 703a in the first rectangular light guide plate 601, pixels 701b, 702b and 703b in the second rectangular light guide plate 611, and pixels 701c, 702c and 703c in the third rectangular light guide plate 621 are misaligned.

Each of the three light source groups includes a light source, a light source collimation system and a prism, of which functions are the same as that in the first embodiment. For example, the light source included in the first light source group is a red light source, the light source included in the second light source group is a green light source, and the light source included in the third light source is a blue light source. Light-emerging surfaces of the three rectangular light guide plates respectively emit light of corresponding colors.

According to the positional relationship among the three rectangular light guide plates, light emitted by each pixel in the third rectangular light guide plate 621 emerges after passing through the second rectangular light guide plate 611 and the first rectangular light guide plate 601, and light emitted by each pixel in the second rectangular light guide plate 611 emerges after passing through the first rectangular light guide plate 601. In addition, light emitted by a pixel in the first rectangular light guide plate 601, light emitted by a corresponding pixel in the third rectangular light guide plate 621 of which the projection position is adjacent to the pixel in the first rectangular light guide plate, and light emitted by a corresponding pixel in the second rectangular light guide plate 611 of which the projection position is adjacent to the pixel in the first rectangular light guide plate, emerge in a same direction. For example, as shown in FIG. 7, light emitted by the pixel 701*a* in the first rectangular light guide plate 601, light emitted by the pixel 701*b* in the second rectangular light guide plate 611, and light emitted by the pixel 701*c* in the third rectangular light guide plate 621 emerge in a same direction. The case is the same for pixels 702*a* to 702*c*, and pixels 703*a* to 703*c* In terms of the viewing effect of human eyes, light emitted by the above three light guide plates finally emerges from the first rectangular light guide plate 601 with non-overlapping positions of light of three colors in a same direction, thereby having the same effect as a common display in which one pixel includes three sub-pixels.

In the above two embodiments, the light source is a monochromatic light source, such as a strip-shaped LED light source. The light source collimation system is a Fresnel lens array, which collimates scattered light emitted by the light source into parallel light, thereby reducing crosstalk of light incident from directional light sources at different incident angles.

Further, as an extension of the above two embodiments, light sources of a same color may be provided on two opposite sides of a rectangular light guide plate, to increase the illumination intensity of the light guide plate, thereby enhancing the display effect.

Naked-eye 3D display can be implemented by combining the above multi-view directional backlight module with a liquid crystal panel performing image refreshing. The multi-view directional backlight module may be combined with the liquid crystal panel in the following two manners. In a first manner, the rectangular light guide plate is provided with a light source on one side of a pair of parallel opposite sides, sub-pixels on the liquid crystal panel are aligned with sub-pixels in the rectangular light guide plates, light guided by the rectangular light guide plates at a viewing angle matches with an image on the liquid crystal panel at the viewing angle, the multiple rectangular light guide plates switch colors to match the colors required by the liquid crystal for forming an image, and with sequential refreshing of the liquid crystal panel, naked-eye 3D display can be obtained. In a second manner, the rectangular light guide plate is provided with light sources on both sides of a pair of parallel opposite sides, sub-pixels on the liquid crystal panel do not need to be aligned with sub-pixels in the rectangular light guide plates, image control are performed by the crystal liquid panel, the light guide plate performs active switching on light sources of a same color between two opposite directions to implement switching between images at different viewing angles. The red light source is described as an example. The light source on one side of the rectangular light guide is first lit, red pixels emit a first image at a viewing angle (or multiple viewing angles) under control of the liquid crystal panel. Then the light source on the opposite side is switched to be lit, the red pixels form a second image at a viewing angle symmetrical with the viewing angle of the first image relative to the normal under control of the liquid crystal panel, such that the first image is received by the left eye, and the second image is received by the right eye. Naked eye 3D display can be acquired by matching different directional light beams with images on the liquid crystal panel, and matching image refreshing of the liquid crystal panel with switching between light sources at both sides.

Figure 8:
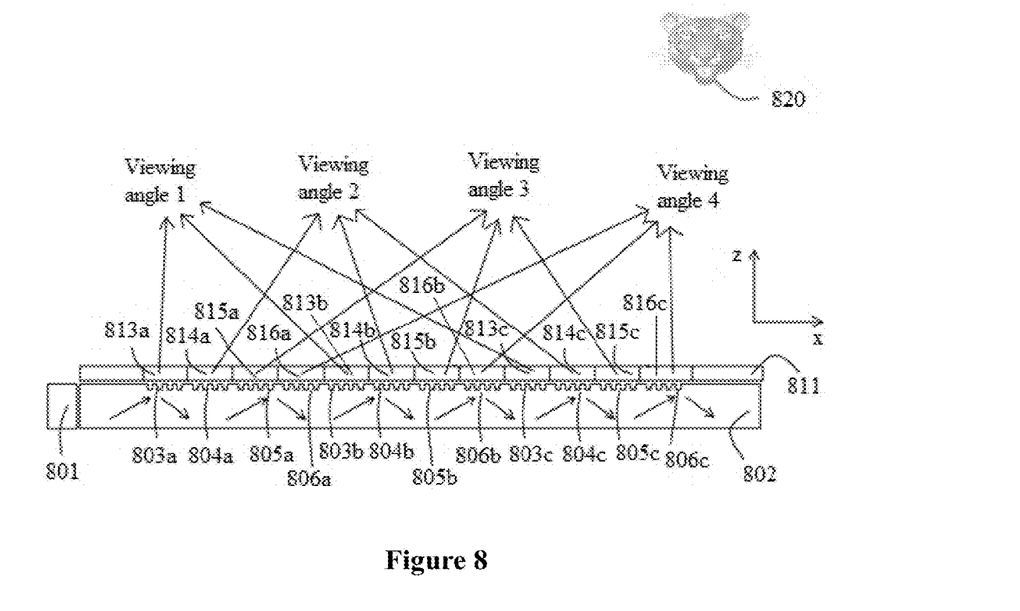
FIG. 8 is a schematic structural diagram of a 3D display device formed by the multi-view pixel directional backlight module according to the present disclosure.

Reference is made to FIG. 8, which is a schematic structural diagram of a 3D display device formed by the multi-view pixel directional backlight module according to the present disclosure. The 3D display device includes the above described multi-view pixel directional backlight module and a liquid crystal panel 811 provided in front of the multi-view pixel directional backlight module, as well as a drive apparatus for driving the liquid crystal panel 811 (not shown in the figure). In the multi-view pixel directional backlight module in the figure, 801 represents all light source groups, and 802 represents a structure formed by stacking multiple layers of rectangular light guide plates. Considering the viewing angle separation and focusing effect, the multi-view pixel directional backlight module and the liquid crystal panel 811 are combined in the first manner. The rectangular light guide plate 802 is provided with a light source on one side of a pair of parallel opposite sides, and image pixels having a viewing angle on the liquid crystal panel 11 are aligned with nano-diffraction grating pixels having a corresponding viewing angle in the rectangular light guide plates 802, thereby achieving separation of images of multiple viewing angles. Pixels of different colors in the multi-layer rectangular light guide plate 802 are matched with color images on the liquid crystal panel, and form tone scale combinations under adjustment by the liquid crystal molecules in corresponding pixels on the liquid crystal panel. Meanwhile, images on the liquid crystal panel are sequentially refreshed, thereby acquiring multi-view naked-eye 3D display. Taking the 3D display device in the figure as an example, the rectangular light guide plate 802 is etched with nano-diffraction grating pixels 803*a* to 803*c*, 804*a* to 804*c*, 805*a* to 805*c*, and 806*a* to 806*c*, which respectively correspond to viewing angle 1, viewing angle 2, viewing angle 3 and viewing angle 4. It is assumed that a pupil distance of human eyes is 60 mm, and a viewing angle pitch equal to the pupil distance, the optimal viewing distance is 300 mm, a width of the liquid crystal panel is 250 mm, the nano-diffraction grating pixels are uniformly distributed on the surface of the rectangular light guide plate, and viewing angles are uniformly distributed within the viewing plane. After calculation, viewing angles of nano-diffraction grating pixels 803*a* to 803*c* (an angle between the diffracted light beam and the positive direction of the z axis, where an angle towards the positive direction of the x-axis is expressed as a positive angle) are 6.7°, −10.6° and −26.1° respectively, viewing angles of nano-diffraction gratings 804*a* to 804*c* are 13.5°, −3.6° and −20.1° respectively, viewing angles of nano-diffraction gratings 805*a* to 805*c* are 20.1°, 3.6° and −13.5° respectively, and viewing angles of nano-diffraction gratings 806*a*-806*c* are 26.1°, 10.6° and −6.7° respectively. Meanwhile, pixels of corresponding viewing angles 813a to 813c, 814a to 814c, 815a to 815c, and 816a to 816c on the liquid crystal panel 811 are respectively aligned with pixels 803a to 803c, 804a to 804c, 805a to 805c, and 806a to 806c in the rectangular light guide plate 802, thereby achieving separation of images of four viewing angles. In addition, the image on the liquid crystal panel is continually refreshed. Meanwhile, as in the second embodiment and the third embodiment, pixels of different colors in the multi-layer rectangular light guide plate match with colors of the generated image under control of liquid crystal molecules. Therefore, a 3D image, for example, the 3D image 820, can be viewed at any two successive viewing angles. If a planar image without parallax is displayed on the liquid crystal panel 811, two-dimensional planer display can be achieved. Therefore, this combination supports both the stereo image and the planar image.

Figure 9:
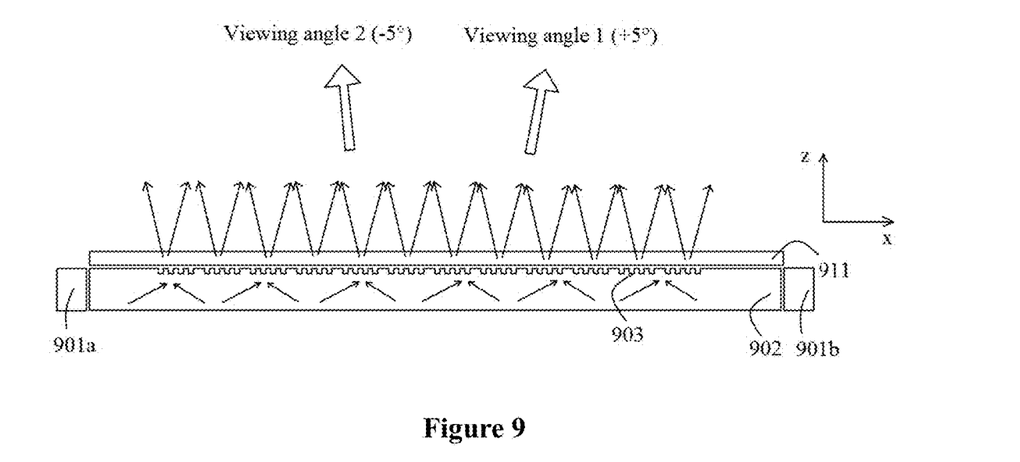
FIG. 9 is a schematic diagram of another 3D display device formed by the multi-view pixel directional backlight module according to the present disclosure.

Reference is made to FIG. 9, which is a schematic diagram of another 3D display device using the multi-view pixel directional backlight module according to the present disclosure. As compared with the above embodiment, the main concern in this embodiment is to obtain a high-resolution image, and the multi-view pixel directional backlight module is combined with the liquid crystal panel 911 in the second manner, where the rectangular light guide plate 902 is provided with light sources on both sides of a pair of parallel opposite sides. This embodiment mainly concerns generating 3D images at multiple viewing angles. As shown in the figure, 901a and 901b each represent a light source group acquired by superposing three light source groups, 902 represents the stacked multi-layer rectangular light guide plate. Nano-diffraction grating pixels in the multi-layer rectangular light guide plate 902 do not need to be aligned with pixels on the liquid crystal panel 911. The two light source groups operate alternately. Because of symmetry of the diffraction angles of the nano-diffraction grating, switching between two viewing angles can be achieved. In combination with switching of images on the liquid crystal panel, separation of images of multiple viewing angles can be achieved. For example, when the light source 901a is turned on, and the light source 901b is turned off, the nano-diffraction grating 903 in the rectangular light plate 902 corresponds to viewing angle 1 of +5° (an angle between the diffracted light beam and the positive direction of the z axis, where an angle towards the positive direction of the x-axis is expressed as a positive angle), and an image having a viewing angle of +5° is displayed on the liquid crystal panel 911 at this time. When the light source 901b is turned on, and the light source 901a is turned off, the nano-diffraction grating 903 in the rectangular light plate 902 corresponds to viewing angle 2 of −5°, and an image having a viewing angle of −5° is displayed on the liquid crystal panel 911 at this time. In this way, separation of images having viewing angles ±5° is achieved. The separated images respectively correspond to the left eye and the right eye of a person. In addition, by matching sequential refreshing of the images on the liquid crystal panel 911 with switching of light sources 901a-901b, and matching color switch of the multi-layer light guide plate with image colors, a high-resolution 3D image can be observed, thereby achieving naked-eye 3D display. If a planar image without parallax is displayed on the liquid crystal panel 911, two-dimensional planer display can be achieved. Therefore, this combination supports both the stereo image and the planar image.

The above rectangular light guide plate may be fabricated using an ultraviolet consecutive variable space frequency lithographic technology and the nanoimprinting process. For the ultraviolet consecutive variable space frequency lithographic technology, one may refer to the lithographic apparatus and the lithographic method disclosed in Chinese patent application No. CN201310166341.1. It is to be noted that, in the present disclosure, the nano gratings having various orientations may be etched on the surface of the rectangular light guide plate using the lithographic method, or may be formed by first fabricating a imprinting mask using the lithographic method, and then imprinting the patterns of a large number of the nano gratings on a rectangular light guide plate using the nanotechnology.

In summary, a multi-view pixel directional backlight module and a naked-eye 3D display device fabricated using the multi-view pixel directional backlight module are disclosed according to the present disclosure. In the present disclosure, the unavoidable problem of interference between three light sources in one light guide plate is solved by stacking multiple layers of light guide plates, thereby achieving a pixel directional rectangular light guide plate. A feasible solution for industrial application of such multi-view directional light guide plate to the naked-eye 3D display technology is provided, and a problem that is not solved in the conventional technology is solved.

With the above descriptions of the disclosed embodiments, the skilled in the art may practice or use the present disclosure. Various modifications to the embodiments are apparent for the skilled in the art. The general principle suggested herein can be implemented in other embodiments without departing from the spirit or scope of the disclosure. Therefore, the present disclosure should not be limited to the embodiments disclosed herein, but has the widest scope that is conformity with the principle and the novel features disclosed herein.

The invention claimed is:

1. A multi-view pixel directional backlight module, comprising at least two rectangular light guide plates closely stacked together, wherein
   a light-emerging surface of each of the at least two rectangular light guide plates is provided with a plurality of pixel arrays, pixels of the plurality of pixel arrays are interleaved with each other in an ordered or unordered manner and are uniformly distributed on the light-emerging surface, lights emitted by pixels in a same one of the plurality of pixel arrays are pointed to a same viewing angle, and lights emitted by pixels in different ones of the plurality of pixel arrays are pointed to different viewing angles; and
   at least one side of each rectangular light guide plate is provided with a light source group, light emitted by the light source group enters the corresponding light guide plate, then emerges from pixels of respective pixel arrays on the light-emerging surface of the light guide plate, and is totally reflected at positions other than positions of the pixels within the light guide plate, each of the pixels is a nano-diffraction grating; and
   wherein the at least two rectangular light guide plates comprise a first rectangular light guide plate and a second rectangular light guide plate;
   a first light source group is provided on one or both sides of a pair of parallel opposite sides of the first rectangular light guide plate, and a second light source group on one or both sides of another pair of parallel opposite sides of the first rectangular light guide plate, and a third light source group is provided on one or both sides of a pair of parallel opposite sides of the second rectangular light guide plate;
   the first light source group emits a first monochromatic light, the second light source group emits a second monochromatic light, and the third light source group emits a third monochromatic light, wherein the first monochromatic light, the second monochromatic light, and the third monochromatic light are of different colors; and each of the pixels in one of the first rectangular light guide plate and the second rectangular light guide plate has a corresponding pixel among the pixels in another one of the first rectangular light guide plate and the second rectangular light guide plate, wherein a projection of each of the pixels in the one of the first rectangular light guide plate and the second rectangular light guide plate on the another one of the first rectangular light guide plate and the second rectangular light guide plate is adjacent to the corresponding pixel, and light emitted by each of the pixels in the one of the first rectangular light guide plate and the second rectangular light guide plate has a same direction as light emitted by the corresponding pixel.

2. The multi-view pixel directional backlight module according to claim 1, wherein the first rectangular light guide plate and the second rectangular light guide plate are stacked with the light-emerging surface of the second rectangular light guide plate facing a non-light-emerging surface of the first rectangular light guide plate, or the light-emerging surface of the first rectangular light guide plate facing a non-light-emerging surface of the second rectangular light guide plate.

3. The multi-view pixel directional backlight module according to claim 2, wherein projections of the pixels in the second rectangular light guide plate on the first rectangular light guide plate are not overlapped with the pixels in the first rectangular light guide plate.

4. The multi-view pixel directional backlight module according to claim 3, wherein each of the pixels in the first rectangular light guide plate comprises two sub-pixels of different colors, light from the first light source group emerges from a first sub-pixel, and light from the second light source group emerges from a second sub-pixel, the light emerging from the first sub-pixel is in a same direction as the light emerging from the second sub-pixel of a same pixel as the first sub-pixel.

5. The multi-view pixel directional backlight module according to claim 3, wherein light emitted by each of the pixels in the second rectangular light guide plate emerges after passing through the first rectangular light guide plate; or light emitted by each of the pixels in the first rectangular light guide plate emerges after passing through the second rectangular light guide plate.

6. The multi-view pixel directional backlight module according to claim 1, wherein the light source group comprises a monochromatic light source, a light source collimation system and a prism, and light emitted by the monochromatic light source is collimated by the light source collimation system, then enters the rectangular light guide plate via the prism, and is totally reflected.

7. The multi-view pixel directional backlight module according to claim 6, wherein the light source collimation system is a planar Fresnel lens array.

8. The multi-view pixel directional backlight module according to claim 1, wherein the light source group comprises a first light source group, a second light source group and a third light source group respectively emitting red light, green light and blue light.

9. The multi-view pixel directional backlight module according to claim 1, wherein viewing angles of the plurality of pixel arrays have a continuous distribution.

10. The multi-view pixel directional backlight module according to claim 9, wherein viewing angles of the plurality of pixel arrays range from 0 degree to 50 degrees.

11. A naked-eye 3D display device, comprising
the multi-view pixel directional backlight module according to claim 1,
a liquid crystal panel located in front of the multi-view pixel directional backlight module, and
a drive apparatus for driving the liquid crystal panel.

12. The naked-eye 3D display device according to claim 11, wherein
the rectangular light guide plate is provided with a light source on one side of a pair of parallel opposite sides,
pixels on the liquid crystal panel are respectively aligned with pixels in the rectangular light guide plates,
light guided by the rectangular light guide plates at a viewing angle matches with an image on the liquid crystal panel at the viewing angle, and
the plurality of rectangular light guide plates switch colors to match colors required by the liquid crystal for forming an image, to acquire naked-eye 3D display.

13. The naked-eye 3D display device according to claim 11, wherein
the rectangular light guide plate is provided with light sources on both sides of a pair of parallel opposite sides,
pixels on the liquid crystal panel are not necessarily aligned with pixels in the rectangular light guide plates,
the liquid crystal panel is configured to perform image control,
the light guide plate is configured to actively switch between two relative directions of light from light sources of a same color, to switch between images at different viewing angles, and
naked-eye 3D display is acquired by matching different directional light beams with images on the liquid crystal panel at viewing angles, and matching image refreshing of the liquid crystal panel with switching between light sources at both sides.

14. A multi-view pixel directional backlight module, comprising at least two rectangular light guide plates closely stacked together, wherein
a light-emerging surface of each of the at least two the rectangular light guide plates is provided with a plurality of pixel arrays, pixels of the plurality of pixel arrays are interleaved with each other in an ordered or unordered manner and are uniformly distributed on the light-emerging surface, lights emitted by pixels in a same one of the plurality of pixel arrays are pointed to a same viewing angle, and lights emitted by pixels in different ones of the plurality of pixel arrays are pointed to different viewing angles; and
at least one side of each rectangular light guide plate is provided with a light source group, light emitted by the light source group enters the corresponding light guide plate, then emerges from pixels of respective pixel arrays on the light-emerging surface of the light guide plate, and is totally reflected at positions other than positions of the pixels within the light guide plate, each of the pixels is a nano-diffraction grating; and
wherein the at least two rectangular light guide plates comprise a first rectangular light guide plate, a second rectangular light guide plate, and a third rectangular light guide plate;

a first light source group is provided on one or both sides of a pair of parallel opposite sides of the first rectangular light guide plate, and a second light source group on one or both sides of a pair of parallel opposite sides of the second rectangular light guide plate, and a third light source group is provided on one or both sides of a pair of parallel opposite sides of the third rectangular light guide plate;

the first light source group emits a first monochromatic light, the second light source group emits a second monochromatic light, and the third light source group emits a third monochromatic light, wherein the first monochromatic light, the second monochromatic light, and the third monochromatic light are of different colors; and each of the pixels in the first rectangular light guide plate has a corresponding pixel among the pixels in the second rectangular light guide plate and another corresponding pixel in the third rectangular light guide plate, wherein each of the pixels in the first rectangular light guide plate is adjacent to a projection of the corresponding pixel on the first rectangular light guide plate, and adjacent to a projection of the another corresponding pixel on the first rectangular light guide plate, light emitted by each of the pixels in the first rectangular light guide plate, light emitted by the corresponding pixel, and the another corresponding pixel have a same direction.

15. The multi-view pixel directional backlight module according to claim 14, wherein the first rectangular light guide plate, the second rectangular light guide plate and the third rectangular light guide plate are stacked with the light-emerging surface of the third rectangular light guide plate facing a non-light-emerging surface of the second rectangular light guide plate, and the light-emerging surface of the second rectangular light guide plate facing a non-light-emerging surface of the first rectangular light guide plate.

16. The multi-view pixel directional backlight module according to claim 15, wherein projections of the pixels in the third rectangular light guide plate on the first rectangular light guide plate, projections of the pixels in the second rectangular light guide plate on the first rectangular light guide plate and the pixels in the first rectangular light guide plate are not overlapped with each other.

17. The multi-view pixel directional backlight module according to claim 16, wherein
light emitted by each of the pixels in the third rectangular light guide plate emerges after passing through the second rectangular light guide plate and the first rectangular light guide plate,
light emitted by each of the pixels in the second rectangular light guide plate emerges after passing through the first rectangular light guide plate.

18. A naked-eye 3D display device, comprising
the multi-view pixel directional backlight module according to claim 14,
a liquid crystal panel located in front of the multi-view pixel directional backlight module, and
a drive apparatus for driving the liquid crystal panel.

19. The naked-eye 3D display device according to claim 18, wherein
the rectangular light guide plate is provided with a light source on one side of a pair of parallel opposite sides,
pixels on the liquid crystal panel are respectively aligned with pixels in the rectangular light guide plates,
light guided by the rectangular light guide plates at a viewing angle matches with an image on the liquid crystal panel at the viewing angle, and
the plurality of rectangular light guide plates switch colors to match colors required by the liquid crystal for forming an image, to acquire naked-eye 3D display.

20. The naked-eye 3D display device according to claim 18, wherein
the rectangular light guide plate is provided with light sources on both sides of a pair of parallel opposite sides,
pixels on the liquid crystal panel are not necessarily aligned with pixels in the rectangular light guide plates,
the liquid crystal panel is configured to perform image control,
the light guide plate is configured to actively switch between two relative directions of light from light sources of a same color, to switch between images at different viewing angles, and
naked-eye 3D display is acquired by matching different directional light beams with images on the liquid crystal panel at viewing angles, and matching image refreshing of the liquid crystal panel with switching between light sources at both sides.

* * * * *